United States Patent
Kim

(10) Patent No.: US 10,124,245 B2
(45) Date of Patent: Nov. 13, 2018

(54) QUIZ GAME PROVIDING SYSTEM USING USER CREATING QUIZ GAME SET AND METHOD THEREOF

(71) Applicant: KSEEK CO., LTD, Daejeong (KR)

(72) Inventor: Young-Real Kim, Daejeon (KR)

(73) Assignee: KSEEK CO., LTD., Daejeon (KR)

( * ) Notice: Subject to any disclaimer, the term of this patent is extended or adjusted under 35 U.S.C. 154(b) by 0 days.

(21) Appl. No.: 14/768,695

(22) PCT Filed: Jun. 3, 2014

(86) PCT No.: PCT/KR2014/004943
§ 371 (c)(1),
(2) Date: Aug. 18, 2015

(87) PCT Pub. No.: WO2015/186848
PCT Pub. Date: Dec. 10, 2015

(65) Prior Publication Data
US 2017/0072300 A1    Mar. 16, 2017

(51) Int. Cl.
*A63F 9/18* (2006.01)
*G06Q 30/02* (2012.01)
(Continued)

(52) U.S. Cl.
CPC .............. *A63F 9/183* (2013.01); *A63F 13/46* (2014.09); *A63F 13/63* (2014.09); *G06Q 20/085* (2013.01);
(Continued)

(58) Field of Classification Search
USPC ..................................................... 463/25–42
See application file for complete search history.

(56) References Cited
U.S. PATENT DOCUMENTS

| 6,267,379 B1 * | 7/2001 | Forrest | A63F 9/183 273/431 |
| 6,863,606 B1 * | 3/2005 | Berg | A63F 9/183 463/16 |

(Continued)

*Primary Examiner* — Masud Ahmed
(74) *Attorney, Agent, or Firm* — IPLA P.A.; James E. Bame

(57) ABSTRACT

A quiz game content producing method enables a quiz creator to make, register, and publicize a quiz game set so that other people are able to use the quiz game set in the unit of the quiz game set which comprises one or more quiz steps and game progression material. The present invention also relates to a system and a method for providing a quiz game for a quiz participant who is connected to a quiz channel by enabling a quiz operator to use a publicized quiz game set. In addition, the present invention relates to a system and a method for providing a quiz game using a bidirectional quiz step. The present invention enables a quiz creator to: compose each quiz step by using a unique creative technique in the arrangement of quiz questions or the progression schedule of a quiz game according to selections or difficulties of the overall quiz questions; and develop quiz game content of a quiz game set unit which includes the quiz step. The creation of a quiz game set can be activated by accumulating points or providing a prize for a quiz creator and a quiz operator in a process in which the quiz creator creates the quiz game set and the quiz operator provides a quiz game for quiz participants. The present invention is able to provide a quiz solving game based on the quiz game set by enabling anyone to easily open a quiz channel and invite acquaintances as quiz participants.

5 Claims, 10 Drawing Sheets

(51) Int. Cl.
*G06Q 50/10* (2012.01)
*A63F 13/46* (2014.01)
*A63F 13/63* (2014.01)
*G06Q 20/08* (2012.01)

(52) U.S. Cl.
CPC ......... *G06Q 30/02* (2013.01); *G06Q 30/0209* (2013.01); *G06Q 50/10* (2013.01)

(56) References Cited

U.S. PATENT DOCUMENTS

| | | | | |
|---|---|---|---|---|
| 7,694,974 | B1* | 4/2010 | Fowler-Gehring | A63F 1/04 273/429 |
| 2002/0042293 | A1* | 4/2002 | Ubale | A63F 13/12 463/9 |
| 2007/0077975 | A1* | 4/2007 | Warda | A63F 13/12 463/9 |
| 2009/0091087 | A1* | 4/2009 | Wasmund | A63F 9/18 273/430 |
| 2012/0088561 | A1* | 4/2012 | Hohmann | A63F 9/183 463/1 |

* cited by examiner

FIG. 7

Quiz step setting

Background picture: Grassland / Cloud

Query word: [          ]

Presenting work: 1 [  ] 2 [  ] 3 [  ]

Background music: Nonuse / Wind sound / Samulnori

Hint: 1 [  ] 2 [  ] 3 [  ]

Example answer: 1 [  ] 2 [  ] 3 [  ]

Effect sound: Nonuse / Vibration / Bell sound

Best answer: [ 1 ]    Closing time: [ 50 ] second

Best answer condition:
- The first most choice #1
- The second most choice #2
- Input value of team leader @T
- Team member conformity Closing condition1:
- Time-out
- 80% Answer completion  80%
- after first answer 20 seconds  +20
- Everyone answer Closing condition2: ● Everyone answer  ○ First [  ] person answer  ○ First [  ] % answer Hint presented: ○ [  ] second pass  ● [  ] % during answering  ■ Repetition Scoring method: ○ Team scoring  ● Personal scoring ○ [  ] Second unit  ● [  ] Person answer  ○ [  ] % answer

[ 8 ] [ 6 ] [ 3 ] [ 1 ] [  ] [  ] [  ]

Sum method: ■ Simple sum    ■ During wrong answer Initialization

Correct answer analysis: [          ]

QUIZ GAME PROVIDING SYSTEM USING USER CREATING QUIZ GAME SET AND METHOD THEREOF

BACKGROUND

The present invention relates to a quiz game providing system and a method for providing a quiz game to a plurality of quiz participants using a quiz terminal connected to a quiz operating server by means of a communication means based on a quiz game set including a plural quiz steps. More specifically, the present invention relates to a user creating quiz game providing system and a method in that a game producer organizes the plural quiz questions by the unit of the quiz game set and stores them in a DB and a quiz operator searches the DB and finds the quiz game set so as to provide the quiz game to the plural quiz participants connected in a real time by using the searched quiz game set. The present invention relates to a real time bidirectional quiz service system and a method thereof in that it synchronously receives quiz answers from the quiz participants in each quiz solving of the several steps included in the quiz game set for the quiz participants, gives marks according to the best answer condition, reflects the score result on the participant according to the fixed mode, and determines the total scores and the ranking or the prize winner after the quiz solving of the middle step or the final step is terminated.

An on-line quiz game is provided as the various types. The quiz game is utilized as a means for recognizing the specific keyword in the publicity event and is provided with the purpose of the education or of determining the performance of the education. In the broadcasting program, the various types of the quiz shows are provided for the viewer.

In the quiz show of the broadcasting program or the quiz game on the internet site, the giveaway is provided to the quiz participant having the excellent result or the winner.

In the existing quiz game, the quiz generator and the quiz operator are very restrictive. Moreover, since the quiz for the unspecified individuals is mainly registered, it is limited to the specific relational person or the specific area. Accordingly, it is difficult to sponsor the on-line quiz game based on the profitable and familiar quiz questions.

Moreover, since the quiz etc. according to the questionnaire of the specific category objects based on only the person belonging to the specific tissue or the person connected with the specific person is progressed, it is still difficult to interpret the state of mentality or the opinion distribution of the specific category objects.

In another conventional technology on this field, the quiz query is putted on the Internet etc. and the user of asynchronously hearing the question answers the query. After the completion of the answer on the presented questions, it scores the answer and provides the score results to the users.

In the conventional technology, in the current situation in that the network means such as the Internet etc. is generalized, it is difficult to understand as to whether the person of knowing the question clearly recognizes the correct answer or the person searches for the answer through the network retrieval service.

There is a user creation quiz service provided through the internet etc. as further another conventional technology on this field. In this conventional technology, the users register the quiz and other users are utilized in solving the quiz. However, since the quiz questions are constituted in a unit of individual quiz question, there is a limit in that the quiz producer presents the plural quiz questions according to the different level of difficulty, the correlation thereof, and the schedule thereof. Also, it is difficult to apply the progress schedules and methods between each quiz question according to the intention of the quiz producer.

SUMMARY OF THE INVENTION

Accordingly, the present invention has been made to solve the above-mentioned problems occurring in the prior art, and a object of the present invention is to provide a quiz game providing method in that it prepares a quiz channel according to the request of the quiz operator, it invites the plural persons to the quiz channel, and the invited persons solve the several quiz steps synchronously provided by using the terminal connected through the communication means, thereby easily operating the real-time quiz game service of automatically determining the score calculation and the ranking thereof.

Another object of the present invention is to provide a quiz game providing method based on a user creating quiz in that the quiz operator provides the quiz game to the plural quiz participants connected at the same time by using the quiz game set including the plural quiz steps.

Further another object of the present invention is to provide a configuration method and a copyright module having the data format of the quiz game set and the quiz step in that it automatically provides the quiz game to the persons connected to the same channel at the same time based on the quiz game set including the plural quiz steps.

Further another object of the present invention is to provide a bidirectional quiz game providing system and a method thereof in that it can easily prepare and operate a bidirectional quiz questions of determining the best answer by means of the participating shape of the participant, the individual information, the opinion or the quiz answer presented in the specific step in a state that the correct answer of the quiz is not determined.

According to one aspect of the present invention so as to accomplish these objects, there is provided to a method for preparing a quiz game set including at least one quiz step and a game progress data for operating the quiz game set and registering and disclosing them in the quiz operating serve. That is, it prepares the quiz game set data including at least one quiz step for progressing the quiz game of one set and the schedule and additional materials for the quiz progression about each quiz step and registers and discloses them in the server so as to utilize other users.

According to another aspect of the present invention so as to accomplish these objects, there is provided to a bidirectional quiz solving service method for connecting the quiz game provider to the quiz operating server, preparing the quiz channel, inviting the quiz participants, and providing the quiz solving service to the invited quiz participants including steps of requesting the preparation of the quiz channel by means of the quiz operator, preparing the quiz game set for using in the quiz step, transmitting the quiz query to the terminal of the quiz participant, receiving the quiz answer until a fixed answer closing condition is satisfied, scoring the quiz answer, reflecting the score result on the quiz participant, and calculating the accumulated point or ranking or determining the giveaway receiver when the quiz step is finished.

Here, the quiz game set preparing step includes a first mode of organizing the quiz game set by directly transmitting the quiz data using the quiz terminal and a second mode of searching and finding the disclosed quiz game set registered by the quiz producer.

Moreover, it can further includes a step of registering the quiz game set as the disclosure quiz game set in the quiz operating server by means of the quiz producer. Here, the disclosing method can be divided into a free disclosure, a pay disclosure, and a sponsor disclosure. Also, it can receive and provide the giveaways of the various shapes in return for the citation according to the disclosure. Moreover, the quiz participants can be divided into at least two groups and the scoring can be independently applied according to the best answer conditions used in each group so as to provide the competition game according to the best answer condition. According to further another aspect of the present invention so as to accomplish these objects, in a quiz game providing method in that it displays the received quiz query to the quiz participants, transmits the corresponding quiz answer data to the quiz operating server if the quiz participant selects or inputs the answer, connects to the quiz terminal or the plural quiz terminals through the network means so as to display the score result on the screen if the score result or the reflecting result of the scoring is received from the quiz operating server, prepares the quiz channel according to the request of the quiz operator, and allows the quiz terminal to be connected to the quiz channel so as to provide the quiz game of various quiz steps synchronized in real time to the quiz participants connected to the quiz terminals, there is provided to a bidirectional quiz solving system including a quiz operating server for preparing a quiz channel according to the request of the quiz channel preparation of the quiz terminal used by the quiz operator; preparing the quiz game set necessary for the quiz solving; gradually providing the quiz solving service of each quiz step included in the quiz game set to quiz participants of entering into the quiz channel; receiving the quiz answer before the satisfaction of an answer closing condition established previously in each quiz step; scoring the answer according to the method established previously in each quiz step; reflecting the score result on the participant in each quiz step according to the method established in the quiz game set; and calculating the final score and the final ranking or determining the winners when all quiz steps of the quiz game set are finished and a quiz terminal for connecting to the quiz operating server through the network means; participating into the quiz channel so as to receive quiz queries of each quiz step of a quiz solving service; outputting them for the quiz participants; and transmitting the quiz answer data to the server when the quiz participant selects or inputs the answer.

The quiz operating server is provided with a quiz operating tool for registering and managing the quiz produced by the user. The user can determine the disclosure method and the disclosure or the nondisclosure thereof. Also, the user uses the quiz game set produces by oneself through the quiz channel or provides the quiz game through the quiz game set produced and disclosed by other person.

According to the embodiment of the present invention, the quiz producer prepares and registers the quiz game set as the quiz contents for operating the quiz game of one set and controls the schedule and the additional information, so that it can reflect the intention of the quiz producer about the quiz operation. Also, the other quiz operator provides the quiz game based on the quiz game set and the point of the quiz game set or the quiz step is endowed, so that the effect according to the supply of the quiz game can be accelerated and the open of the rank information and the compensation about this can be performed, thereby developing and promoting various quiz more and more.

According to the embodiment of the present invention, the users can arbitrarily open the quiz channel, invite the persons to the channel, and provide the quiz game by using the quiz game set having the plural quiz steps. In the specific company or group, the plural quiz steps can be provided to the members and the rank can be decided. The plural quiz steps can be solved against the students of the specific course of education, so that it can be judged as to whether the educated contents are fully aware or not.

According to the embodiment of the present invention, the user prepares and registers the characteristic quiz question from the various fields and materials and the quiz operator finds the preferred quiz game set through the search and provides the quiz game to the other quiz participant, so that the quiz contents can be shared. That is, if one quiz producer creates and registers the quiz game set and it is stored in the quiz repository, so that the other quiz operator searches it and the quiz game set can be shared with the format used through the quiz channel. Here, since the quiz producer determines not only the quiz question but also the guide message, the hint, the scoring method, the reflecting method of the score result, and the answer closing condition, the scoring method, and the answer closing condition etc., it can revive the configuration intention of the quiz game set in comparison with the sharing of only the quiz question. Also, it has an effect that the creativity of the quiz producer is reflected by supporting the sharing method of the quiz game set unit in comparison with the sketchy sharing of the quiz question. That is, when the quiz producer prepares the quiz game set, the difficulty quiz step is arranged and the quiz question for the correlated theme and material can be utilized, so that the inventive technique of the quiz producer can be applied thereto.

According to the embodiment of the present invention, it defines the configuration format of the bidirectional quiz contents capable of competing the ranking or the score by participating the plural users into the quiz game at the same time, thereby easily producing and distributing the quiz contents.

BRIEF DESCRIPTION OF THE DRAWINGS

The above and other objects, features and advantages of the present invention will be more apparent from the following detailed description taken in conjunction with the accompanying drawings, in which:

FIG. 7 is an example view illustrating a screen for the edit of a quiz step;

DETAILED DESCRIPTION OF THE INVENTION

Figure 1:
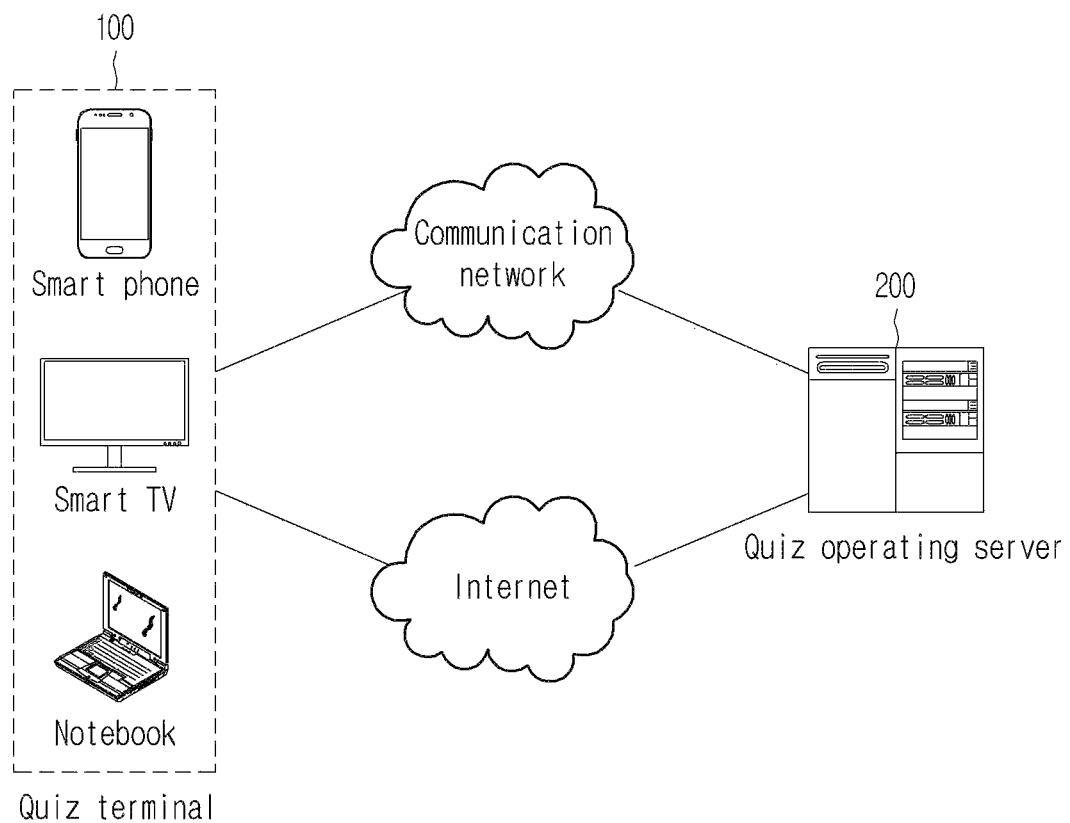
FIG. 1 briefly shows the configuration of the real time quiz operation system of becoming a background of one embodiment according to the present invention.

Hereinafter, embodiments of the present invention will be described in detail with reference to accompanying drawings. In the drawings, parts irrelevant to the description are omitted for a clear explanation of the present invention, and the same reference numeral is applied to the same parts throughout the specification.

Throughout the specification, when a part is described as including an element, it should be interpreted that other elements may be further included rather than being excluded unless mentioned otherwise. In addition, a term such as a "~unit", a "~module", etc. described in the specification refers to a unit that processes at least one function or operation, and may be implemented in a hardware form or a software form, or a combination of the hardware form and the software form.

In the whole specification, the quiz means a question for requesting the submission of the answer at the online quiz participant and scoring the answer of the quiz participant.

In the whole specification, a "quiz game set" is the form of contents data configured to progress the quiz game of one set. The quiz game set includes at least one quiz step and quiz progression information. The game progress data for automatically progressing the quiz game includes a reflecting method of the score result and the answer closing condition of the quiz step etc. The game progress data further includes the guide material about the quiz game set, the delay time or data transfer schedule materials of each progress step, the beginning and closing notice materials of the quiz game, the delay time of the quiz step etc. If the quiz channel is prepared, it provides the quiz game of one unit by using at least one quiz game set.

In the whole specification, a "quiz step" is the form of the quiz data including at least one quiz or survey and the best answer or the best answer condition. Or, it means the procedure of the quiz game progress of receiving the answer from the plural quiz participants connected in real time according to the fixed answer closing condition to be scored and reflecting the score results to the participants. Moreover, the quiz step can further include a hint, a presenting data, a question help, a solving message, a description etc. The presenting data included and presented in the quiz question may be any type of a presenting word, a presenting drawing, a presenting sound etc.

In the whole specification, a "quiz channel" is a virtual operation space of the quiz game arbitrarily opened and operated in the quiz operating server according to the request of the quiz operator. The quiz channel is opened in the quiz operating server and the quiz operator and quiz participant enter the quiz channel to be participated in the quiz game by using the quiz terminal. The quiz channel is subdivided into a private quiz channel capable of entering through only the invitation of the quiz participant, a disclosure quiz channel capable of participating anyone, and an exposure quiz channel of showing the list on the quiz terminal.

In the whole specification, a "quiz operator" is a person of opening the quiz channel in the quiz operating server by using the quiz terminal, inviting the quiz participant to the quiz channel, and providing the quiz game to the quiz participants based on the quiz game set.

In the whole specification, a "quiz participant" is a person of connecting to the quiz operating server by using the quiz terminal, entering the specific quiz channel, participating in the quiz game provided from the quiz channel.

In the whole specification, a "quiz producer" is a person of producing the specific quiz game set or the quiz step. The quiz producer may be the quiz owner, since the quiz producer involves in the producing of the quiz and exercises the possessing right of the quiz.

In the whole specification, an "individual event" means the form of the quiz game in which the quiz participants of participating in the unit quiz channel compete through the quiz solving while managing the individual score administration.

In the whole specification, a "team event" means the form of the quiz game in which the quiz participants of participating in the unit quiz channel constitute several teams while managing the team score.

In the whole specification, a "quiz history information" means the overall record according to the production and the application of the quiz. The quiz history information includes a quiz use information on the quiz game set or the quiz step used by the quiz operator in the providing of the quiz game, the quiz reference information referred by the quiz producer when the quiz producer prepares the quiz game set and quiz step, and a quiz satisfaction or quiz users' comments as an evaluation result about the quiz of the quiz operator or the quiz participant.

In the whole specification, a "quoted information" means the information quoted on the existing quiz game set or the quiz step when the quiz producer prepares the new quiz game set and quiz step. It may be any one of the quoted number thereof, the quoted quiz operator, the quoted and generated quiz game set, and the satisfaction or users' comments.

In the whole specification, a "giveaway" means the cost about the activity of the quiz producer, the quiz operator, and the quiz participant. It may be any one of a cash, a gift certificate, a goods, a point, a cyber money, a discount ticket, a free ticket, and a securities.

<Quiz Game Set>

The quiz game set as one unit capable of operating the quiz game of one set by means of participation the simultaneously participating in the quiz channel includes at least one quiz step and the game progress data. The game progress data includes a best answer, an answer closing condition, a scoring method, and a reflecting method of the score result etc. The game progress data can further include a presenting data, a hint, a guide data, a solving data etc. used in each quiz step. The quiz step is comprised of the quiz query, divided into a survey type and a definite answer type according to the format of the construction thereof, and classified into objective and subjective type according to the answer form thereof. The objective quiz step can further include the example sentence. The survey type quiz step further includes a survey query. The game progress data can be established as the base value so as to be commonly applied to all quiz steps included in the quiz game set or separately designated in each quiz step. That is, the analysis method about the answer, the answer closing condition, or the reflecting method of the score result can be equally designated in all the quiz steps and the values of the items can be separately designated in only the specific quiz step. The game progress data of the quiz game set or the quiz step includes a time data necessary for the delay in the procedure of the game, or any data on the transmission schedule of various data.

The data having the quiz game set includes at least any one data format of the text, the sound, the image, the moving picture etc. The best answer may be a correct answer inputted as a data of a determined format or a condition format of determining the correct answer in future according to the answer analysis of the specific quiz participant. The quiz step further includes an example answer, a hint data, a presenting data, a guide data etc. The hint, the presenting data, the guide data etc. can set up according to the time or the receipt section of the answer. The quiz step can further include the survey for determining the best answer about the survey quiz. The quiz step can further include an explanation data for helping the understanding about the quiz answer and a quiz guide message for guiding the quiz progress. Each of element information of the quiz step described in the above can include the schedule information on the fixed time zone or the receipt section of the answer transmitted to the participation terminal. The receipt section of the answer means the section in which the answer goes on. It can be established as the answer completion of the participant of the specific number, the answer completion condition of the participant of the specific ratio, or the repeating condition of the answer completion.

The game progress data of the quiz game set includes the establishment for providing the progress message and the analysis information before and after the quiz step. Moreover, it includes the information of the quiz producer of the quiz game set, the category classification code, the searching key word, the game introduction guideline, and the game over guide etc. The game progress data of the quiz game set of the sponsor quiz or the quiz step having the sponsor quiz further includes the information of the background image, the quiz question, the image, the sponsor related phrases, and the sound etc.

The quiz game set can further include the set values on the method of analyzing the data or the scoring information received from the quiz terminals on the survey or the quiz question included in each quiz step about the specific quiz step or the entire quiz step and the method of notifying the quiz participant or the quiz operator.

The quiz operating server includes a quiz channel module for transmitting the quiz question to the quiz terminals simultaneously connected, receiving the answers to be automatically scored, managing the scoring contents by user, and determining the ranking thereof. The quiz channel module allows the participants to solve the questions of each quiz step in real time in a state that at least two participants are connected thereto. The quiz channel module automatically progresses all the quiz steps designated by the quiz operator.

Embodiment 1

The embodiment 1 relates to a system and a method for preparing the quiz channel in the quiz server by means of quiz operator using the quiz terminal and providing the quiz game to the plurality of the quiz participants using the quiz terminal according to the operating command of the quiz operator.

FIG. 1 briefly shows the configuration of the real time quiz operation system of becoming a background of the embodiment 1.

The quiz terminal 100 of using by means of the quiz operator or the quiz participant in the embodiment includes a quiz terminal hardware such as a smart TV, a tablet PC, a laptop personal computer, a PC etc. and a software thereof prepared in the hardware to be executed. It is preferred that the quiz terminal 100 is configured to easily create the quiz channel by anybody to be operated and participate in the quiz game, which is operated by the others.

In the embodiment 1, the quiz operating server 200 serves to allow the access of the plurality of the quiz terminals, transmit the quiz to the connected quiz terminal or receive the answer from the quiz terminal, and transmit an automatic scoring, an automatic score accumulating, a ranking result, a ranking change or an analysis material associated with these so as to operate the quiz game.

Preferably, the quiz operating server 200 is configured to be capable of always connecting through the quiz terminal by using the communication means including the internet etc. It is preferred that the quiz operating server 200 is developed in the form of the software set up in the hardware of the PC etc. Also, the quiz operating server is developed in the form of the software installed in the smart phone, the smart TV, the tablet PC etc. Also, it is possible to organize a single system or multiple systems.

Figure 2:
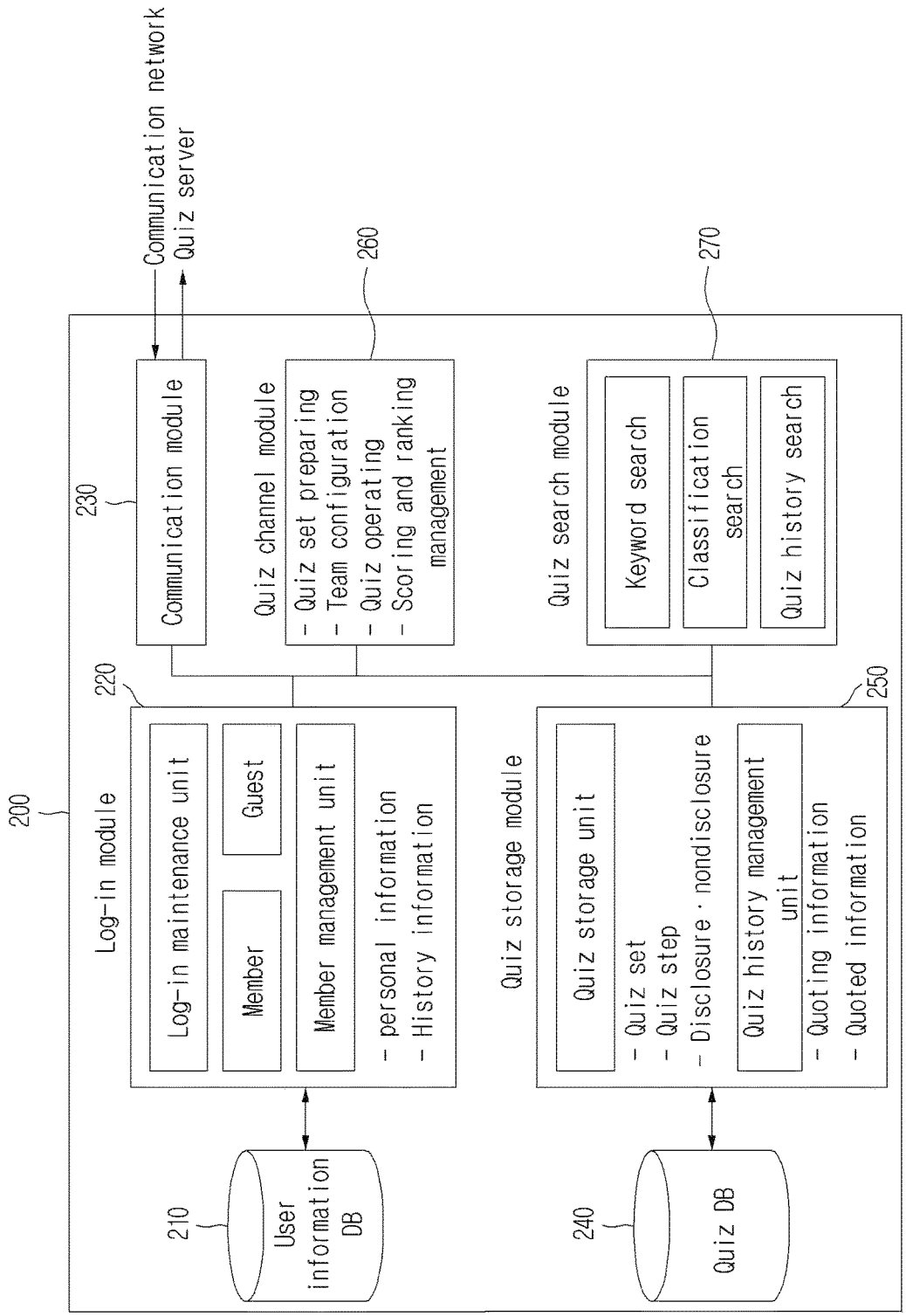
FIG. 2 is a block diagram illustrating a quiz operating server system of one embodiment according to the present invention.

FIG. 2 is a block diagram of the quiz operating server for providing a quiz solving service of various quiz game sets through a real-time synchronization for the plural quiz participants.

The quiz operating server 200 includes a log-in module 220. The log-in module 220 including a log-in maintenance unit and a member management unit serves to register a user ID and a password so as to use them through the log-in. The member registers as the quiz operator, the quiz participant, or the quiz producer and it activates therein through the log-in. Also, the log-in module supports the log-in of the quiz participant as a guest qualification.

The member management unit serves to manage a basic information and a history information of the member. The basic information includes a telephone number, an ID, and a password and a personal information. The personal information includes the information about the private details, the history information relating to the quiz game, the history information related to the quiz game participation, the quiz usage record, the quiz quoting information, and the quiz copyright information etc.

The quiz operating server 200 includes a search module 270 for searching and inquiring the quiz recorded in the quiz DB 240. Where the search request is received from the quiz terminal 100, the search module 270 serves to transmit the search result searched through the search method including the category classification search and the keyword search etc. to the quiz terminal 100.

The quiz operating server 200 further includes a quiz storage module 250. The quiz storage module 250 includes a quiz storage unit for managing the information including the quiz game set, the quiz step etc. and a quiz history management unit for managing a usage record of the quiz game set and the quiz step.

The quiz storage module 250 serves to record and manage the use information of the quiz step and quiz game set and the quiz participant, and the ranking information of the participant etc. The quiz storage module 250 records the participation point of the quiz participant from the participation times, the quiz score, and the ranking result. Also, whenever the participants use the set quiz game set and the quiz step produced by the quiz producer, the quiz storage module 250 serves to store the use information such as the usage count, the participant number, the participating degree of the participant, and the quiz satisfaction etc. The quiz storage module 250 serves to register or delete the quiz game set according to the request of the quiz producer. Also, the quiz storage module 250 sets up a disclosure or a nondisclosure etc. on the set quiz game set produced by the quiz producer, and stores or manages the quoting information or the quoted information of the quiz game set during the registration of the quiz game set registration.

The quiz operating server 200 includes a quiz channel module 260. The quiz channel module 260 provides the quiz game to the quiz participants at the same time, where the plural quiz participants are connected thereto. That is, the quiz channel module 260 serves to perform the quiz step of transmitting the queries to the quiz terminal 100 through the communication module and receiving the answer from the quiz terminal for the designated time limit to be scored. One quiz step includes at least one quiz query. Also, one quiz step further includes a question query. In case of the objective question, it has a data format further including an example answer data. The quiz channel module 260 includes the plural quiz channels, which are virtual spaces so as to support the plural quiz games at the same time. At this time, it has identifiers for each quiz, so that the quiz terminal sets up the specific quiz channel according to the request of the quiz terminal and it distinguishes only the quiz terminal corresponding to the specific quiz channel so as to provide the quiz game. The quiz channel module 260 serves to generate or delete the quiz channel according to the request of the quiz terminal.

The quiz channel module 260 servers to manage the information about the quiz channel and transmit the related information to the quiz terminal. The related information includes the information related to the exposure quiz channel and the information on the disclosure quiz channel capable of participating by anyone. Moreover, where it has the invite of the private quiz channel per the quiz terminal, the related information includes the information corresponding to this.

The quiz operating server 200 further includes a communication module 230 for the log-in of the quiz terminal of the user or the connection maintenance thereof. The communication module 230 serves to allow the access of the quiz terminal through the network by using a protocol corresponding to the quiz terminal and transmit and receive the data with the quiz terminal.

The quiz storage module 250 serves to store the information of the quiz game set designed for the progress of the quiz solving service of one unit or the information of the quiz step capable of selectively adding and using in the quiz solving. The information of the quiz game set and the quiz step includes a name, an identification code, a title, a theme, a keyword for classification, a classified identification table etc. Also, the information of the quiz game set and the quiz step includes the producer, the disclosure condition, and the help etc.

The disclosure condition includes a free of charge disclosure information, a chargeable disclosure information, a sponsor disclosure information, a nondisclosure information. The disclosure condition can include a copyright indication condition or any condition of notifying a specific guideline. The chargeable disclosure information may be a toll payment condition or a point and cyber money payment condition. The sponsor disclosure information may be the type for providing the giveaway to the quiz operator and the quiz participant on condition that the disclosed quiz game set or the quiz step is used.

The quiz storage module 250 serves to create the quiz game set or the quiz step for the user to be stored. Also, it allows the quiz producer to privately use the set quiz game set or the quiz step produced by oneself.

The quiz history management unit of the quiz storage module 250 records and manages an individual quiz history information on the quiz game set or the quiz step. The quiz history information includes a quiz usage information of using the quiz game by the quiz operator, a quiz reference information referred by the quiz producer when the quiz producer prepares the quiz game set and the quiz step, a quiz copyright information associated with the quiz producer, a quiz satisfaction or quiz users' comments as an evaluation result about the quiz of the quiz operator or the quiz participant. Here, the quiz reference information and the quiz use information separately classify into the quiz quoting information. Preferably, the quiz storage module 250 manages the quiz quoting information so as to induce the lively development and registration of the quiz game set of the quiz producer and reflects to the design for inducement plan including the point supply and the offer of premium etc.

The quiz search module 270 provides the systematic searching function and the keyword searching function so as to allow the quiz operator to easily find the quiz game set and the quiz step stored in the quiz DB 240.

Where the quiz operator requests the quiz search through the quiz terminal 10, the quiz search module 270 transmits the search result data on the quiz step and the searched quiz game set to the quiz terminal 100. The quiz terminal 100 outputs the received search result data to the output module 160. The search result data includes the name, the identification code, the delimiter, the title, the quiz query language, the disclosure condition, the quoting related materials etc. capable of identifying the searched quiz game set or quiz step.

Figure 3:
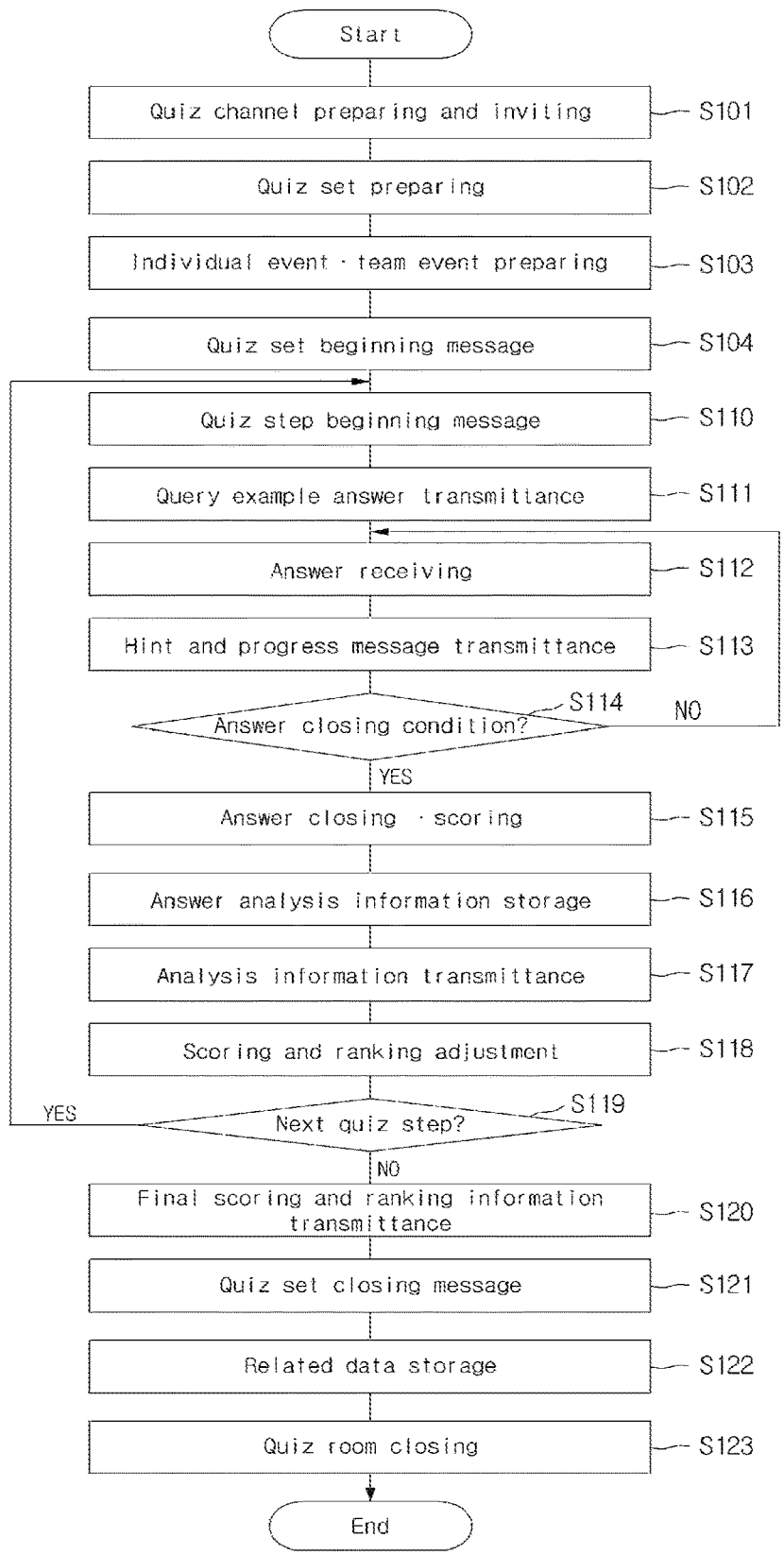
FIG. 3 is a flowchart illustrating an automatic quiz game progressing based on a quiz game set of a quiz channel.

FIG. 3 is a flowchart illustrating an automatic quiz game progressing of a quiz channel module of one embodiment according to the present invention.

The quiz channel module 260 creates newly the quiz channel or initializes and prepares the existing quiz channel in response to the request of the quiz terminal 100 (S101). The quiz channel module sets up the identification code and quiz progression environment of the quiz channel. It sets up the quiz progression environment including the background image, the quiz game title, the background music, the giveaway, and the other announcement etc., so that all quiz operators participate in the quiz game mood in the same mood. The quiz channel module 260 prepares for the quiz game set for the quiz game operation with the request of the quiz operator (S102) and prepares an individual event or a team event according the configuration mode of the quiz game set so as to operate the team-based quiz game (S103). In case of the team-based quiz game, the teams are organized according to the team organization mode established by the quiz operator. The team organization mode may be an automatic classification mode based on the personal information, a mode selected by the quiz participant, a mode directly designated by the quiz operator. In the mode using the personal information, the teams can be divided according to the blood type or can be automatically divided into the residential zone sort or the sex etc. Also, it can be divided into the odd number team and the even number team etc. in terms of the entrance order. Moreover, the teams can be organized by the family or the husband and wife. If each team is established, it can set up a head among the team members. Or, the parts among the other quiz participants organize the teams respectively and invite other quiz participants so as to organize new team under the agreement of the quiz participants.

The quiz channel module 260 allows the participants to be participated by using the identification code capable of identifying each quiz channel. The quiz operator transmits the text message including the link capable of immediately connecting in response to the invitation or it invites the quiz participant by means of the e-mail, the text transfer, or other web notice etc (S101).

The quiz channel module 260 transmits the beginning message to the quiz channel participants if it is included in the quiz game set (S104). The quiz channel module automatically progresses each quiz step of the prepared quiz game set based on the game progress data (S101).

The quiz channel module 260 transmits the quiz step beginning message in the quiz step progress to the quiz terminal 100 (S110). Thereafter, the query information is transmitted at the appointed time (S111). The query information includes the quiz query or the question query. In case of the objective query, the example answer can be further included. Or, the query information can further include the presenting data and the answer closing time etc. The quiz channel module 260 starts the answer receipt from the quiz terminal 100 (S112).

The quiz channel module 260 transmits the progress information of the specific quiz step to the quiz terminal. The progress information of the quiz step may be any one of the total number of the quiz step, the present quiz step number, the number of the remaining quiz step, the total number of the present participant, the present condition of the answer completion, and the participant present condition of the major rank, the average score, the residual answer stop time, the scoring method, and the reflection method of the score result.

The quiz channel module 260 transmits the data related to a presentation word of the quiz step, the hint, the process guide etc. to the participation terminal before the deadline of the answer receipt (S113).

If it satisfies the answer closing condition of the quiz step, the quiz channel module 260 ends the answer receipt (S114). The answer closing condition may be designated as any one of a first mode of checking the progress of the designated answer closing hour, a second mode of checking the answer input completion from the participants corresponding to the predefined number or rate, and a third mode of checking the progress of the designated time after the answer of the first answerer. However, it can be applied to various modes.

After the answer input of the quiz step is finished, the quiz channel module 260 stores the analysis materials of analyzing the answer situation through the mode designated to the quiz step (S116) or the quiz channel module 260 transmits the analysis materials to the quiz terminal of each quiz participant or the quiz operator (S117). The analysis materials includes the kind of many answers, the number of input persons, the kind of the answer according to the age, the sex, the blood type, the residence etc. of the quiz participant, and the deviation thereof etc.

After the answer receipt is finished, the quiz channel module 260 scores the received answers according to the scoring method of the quiz step (S115). Where the correct answer is determined in advance, the answer can be marked as the correct answer or the wrong answer by comparing them with each other. Also, where the best answer is a format of a condition, it analogizes the best answer by analyzing the survey of the quiz participants or the quiz host or the answers of the quiz to be graded. For example, in case of the quiz step including the survey "what is your favorite night rituals?" and the quiz query "What is likely to be the second choice of food?" in the survey, it gives the marks as an answering/non-answering etc. in the survey and it admits the correct answer to only the person of inputting the second most selected food by analyzing the result on the survey in the quiz query. There is an index of coincidence as another type in the condition format. In case of the index of coincidence, it can admit the correct answer when it inputs the same answer as the specific quiz participant or the answer of the selected person is recognized as correct answer. For example, where the husband and wife are participated as one team in the quiz, the question "the first date place?" corresponds to this format. Also, the quiz format including a quiz query "what are the words to evoke from this picture?" is included this format while presenting multiple images in order.

The best answer of the condition format includes a mode designated as the correlation between the answers of the quiz participants. For example, in case of the quiz step using continuous paper-rock-scissors games, when the specific quiz participant selects the scissor, it admits the correct answer to only the participants of inputting the scissor or the rock.

The quiz channel module 260 reflects the score results of the individual participant or the team according to the reflecting method of the score result of the quiz step (S118). The method of reflecting the score result on the individual participant or the team may be any one method of adding a certain score, reducing a certain score, initializing the existing score, failing the specific team or the individuals, and relieving the specific team or the individuals.

Also, it can give the score to the individual or the team according to the determined scoring method on correct answer/incorrect answer/non-inputting. Where it fails to find the correct answer of the quiz step, the certain points are reduced or it is initialized as 0 point to be eliminated. Moreover, even in case of inputting the correct answer, it establishes the answer input time, the answer receipt time, the answer receipt rank etc., so that the scores thereof can be differently set up.

If there is no designated materials in the scoring method of the quiz step, the answer input closing condition of the quiz step, and the reflecting method of the score result of the quiz step etc., it can basically applied according to the data established in the quiz game set.

The quiz channel module 260 goes over to the next quiz step when it has the residual quiz step (S119). When the quiz solving of all quiz steps included in the quiz game set is completed, the quiz channel module 260 notifies the final ranking and the present condition of the score (S120). It stores the quiz solving related information and terminates the quiz game service. The quiz solving related information includes the usage record on the quiz game set or the specific quiz step, the quiz producer of the quiz game set and the quiz step, the quiz operator, and the usage record of the quiz participant, and the point data.

If the quiz channel module receives the control signal of the quiz progression from the quiz operator, it controls the automatic progress method according to the control signal. The control signal includes the temporary pause of the quiz progress, the change of configuration value about the progressing, the omission of the quiz progress step, the addition of the quiz progress step, and the deletion of the quiz progress step.

As described in FIG. 3, in the embodiment 1, it gives the scores in each quiz step, determines the scores of the team or the individual, and determines the midterm ranking according to this. However, after the query transmission and the answer receipt are progressed over the plural quiz steps, it is possible to score each quiz step in a lump and reflect the score result on the participants to decide the ranking again. Moreover, instead of giving the score, the drop-out concept can be introduced. The drop-out can be applied to the quiz participants or the quiz team, when it fails to answer the question or the aggregate score is less than the certain score. In order to smoothly solve the quiz in the repeated quiz step progress by the quiz participant, it designates a proper delay time. However, it is preferred that the delay time included in the game progress data of the quiz game set is used.

Figure 4:
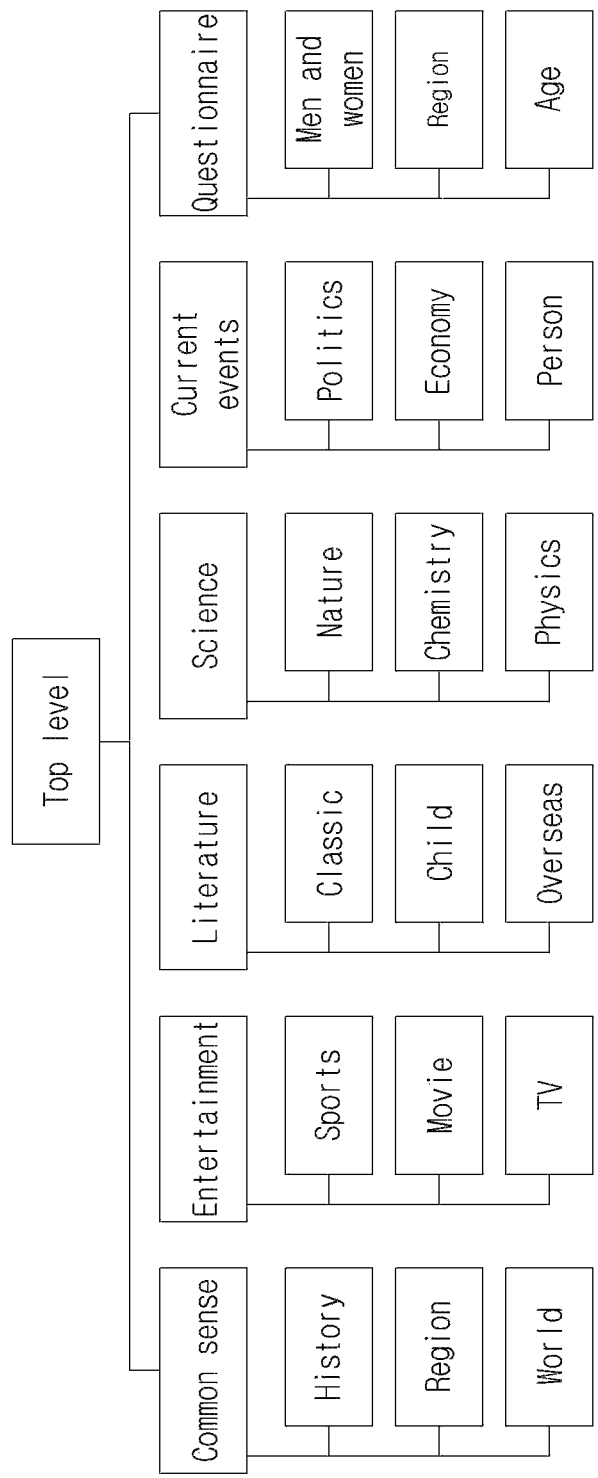
FIG. 4 illustrates a classification table for the classification search.

FIG. 4 illustrates a classification table for the classification search of the embodiment 1.

The classification table of the tree form subdivides into a large classification—a middle classification—small classification—detailed classification, so that it can search the quiz game set or the quiz step included in the range thereof. The quiz search module 270 includes a classification search and a keyword search.

The quiz search module arranges the search data or designates the given range value by using the satisfaction of the quiz participant or the quiz operator, the periodical usage count, the whole usage count, and the usage count of the specific quiz participant section etc. so as to raise the efficiency of the search.

The specific quiz participant section can be classified according to the age groups such as twenty or thirty, the sex, or the residential zone etc. Moreover, it can be classified according to the mix of the multiple standards such as the worker in his 20s.

Figure 5:
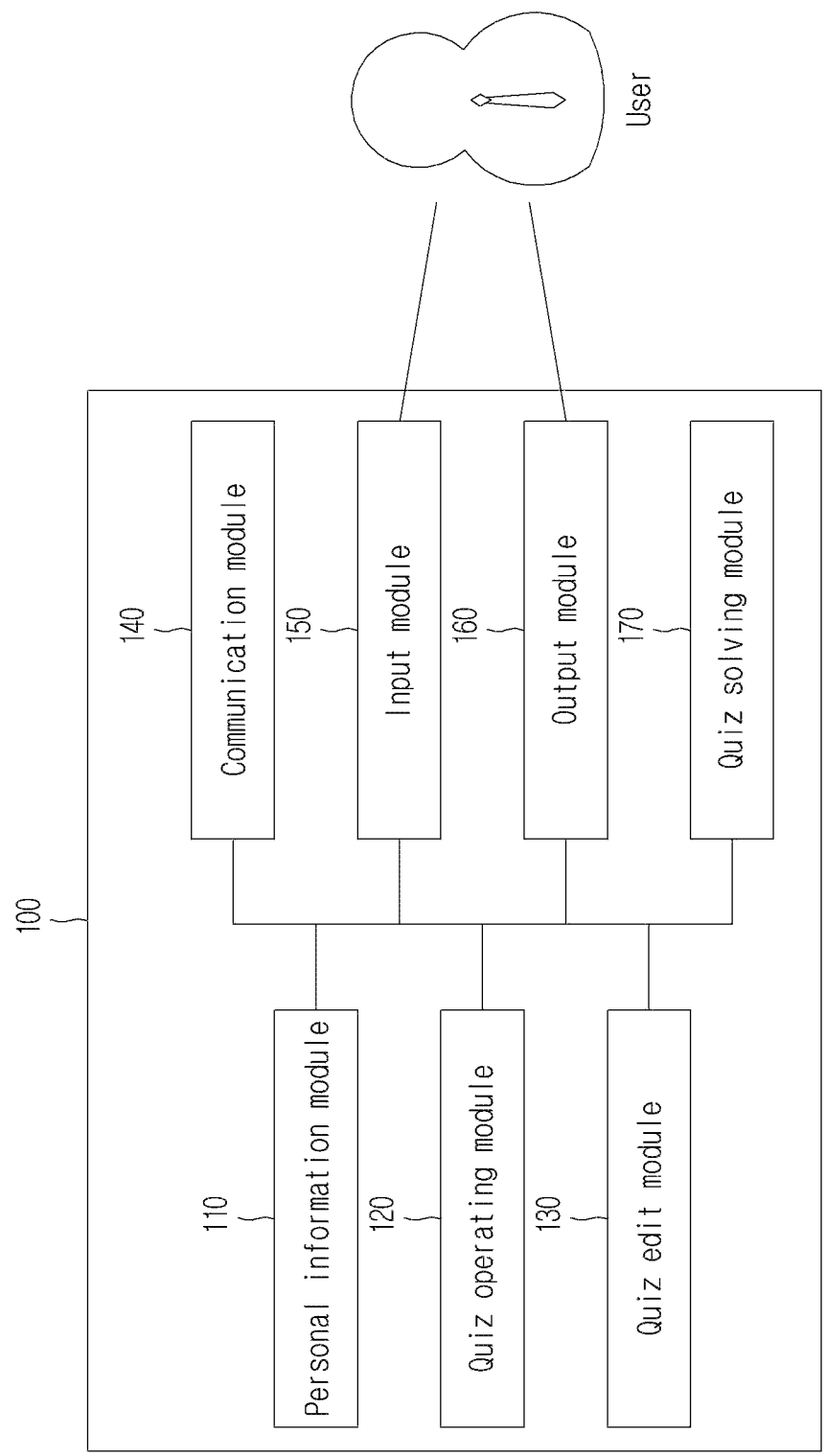
FIG. 5 is a block diagram illustrating a quiz terminal system.
Figure 6:
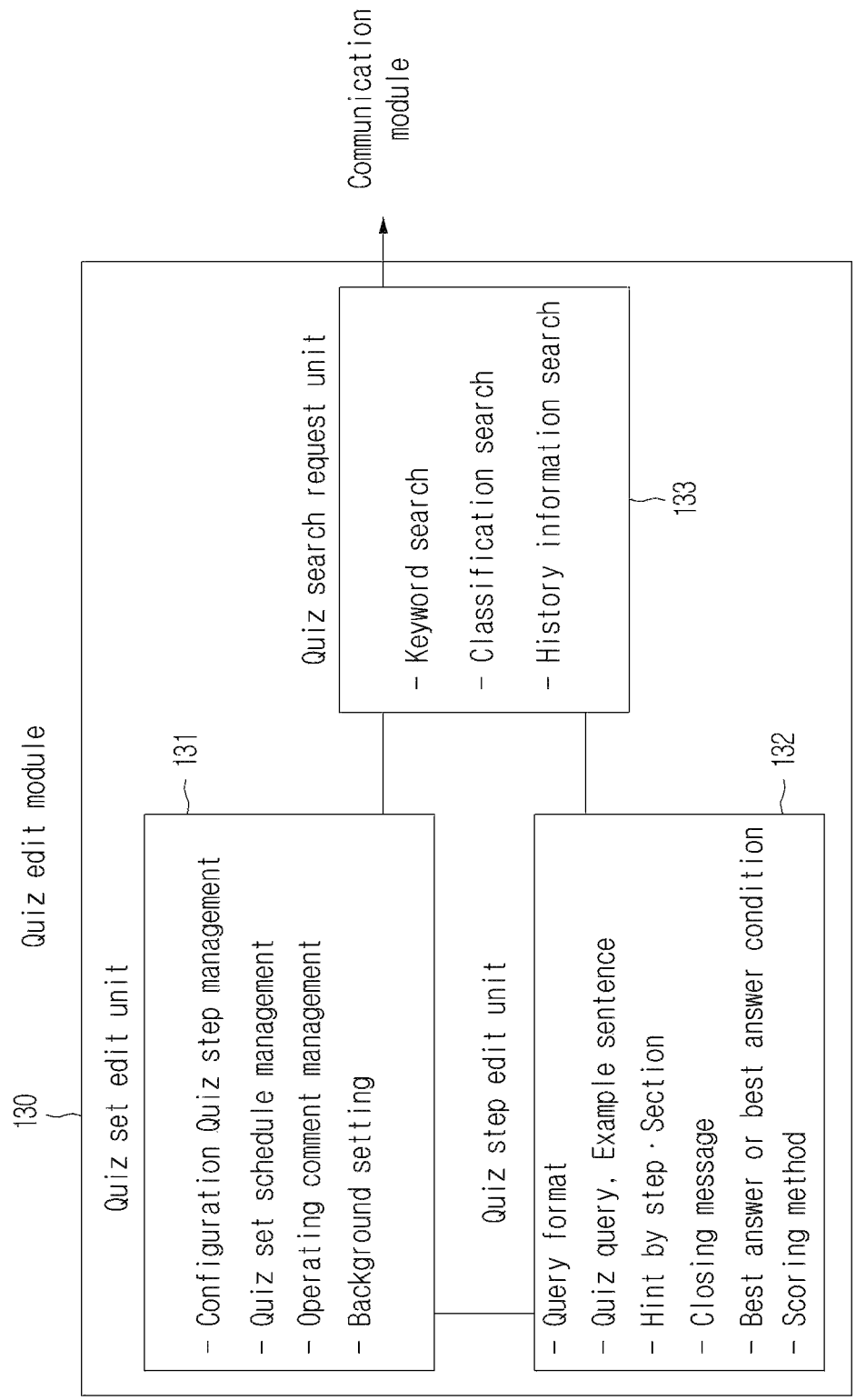
FIG. 6 is a block diagram illustrating a quiz edit module of a quiz terminal.

FIG. 5 is a block diagram of the quiz terminal 100 of the embodiment 1.

The quiz terminal 100 includes a personal information module 110 for managing an individual information, a quiz operating module 120 for connecting to the quiz operating server, opening the quiz channel, preparing for the quiz game set and providing the quiz game; a quiz edit module 130 for preparing the quiz game set including the plural quiz questions and the quiz solving e progress information; a communication module 140 for connecting with the quiz operating server so as to transmit and receive the data; an input module 150 for inputting the answer from the user; an output module 160 for outputting the data to the user; and the quiz solving module 170 for displaying the received quiz data thereon, waiting for the input of the quiz answer sheet or determining the transmittance on the inputted quiz answer sheet. Here, the quiz terminal 100 is shown as one terminal system for convenience. However, it is possible to organize the plural terminal system having the branched functions.

The quiz terminal 100 transmits the personal information of the quiz participant to the quiz operating server so as to register the user or maintain the log-in of the user and provide the means for participating in the specific quiz channel to the quiz participant. In order to participate in the open quiz channel, the quiz terminal indicates the information including the title of the open quiz channel, the quiz operator, and the giveaway etc. received from the quiz operating server. If the quiz participant selects the specific open quiz channel, an entrance notification data is transmitted to the quiz channel. Where the quiz participant inputs the identification code of the specific open quiz channel, the entrance notification data is transmitted to the quiz channel corresponding to the corresponding identification code. In case of the private quiz channel of meeting with the invitation, the list is selected or the link is clicked, so that the entrance notification data is transmitted to the corresponded private quiz channel. When the quiz terminal user successfully enters in the quiz channel, he becomes the quiz participant. At this time, the quiz terminal receives the data of constituting the quiz progress background of the quiz channel so as to establish the quiz progress background of the quiz channel. Where the data of constituting the quiz progress background is the moving picture or the acoustic data, the moving picture or the acoustic data is indicated according to the desired value such as the time and the repetition thereof etc.

The output module 160 of the quiz terminal 100 outputs the quiz progress related data received from the quiz operating server. That is, in order to progress the quiz step, it outputs the query information, receives the subjective answer from the user or displays the example answers for inputting the selecting answer among them. The input module 150 receives the answer from the quiz participant. Here, if the answer closing time is indicated on the query information, the answer can be inputted until the answer closing time. Also, if it receives the analysis information or the ranking information from the server, the corresponding contents is outputted as any data such as the table, the voice, and the graph etc.

The quiz operating module 120 is provided with a quiz operating tool for controlling a temporary suspension of the quiz progress, an omission or an addition of the specific quiz step, and a change of the setting value of ongoing quiz step which is progressing etc. in the quiz solving service of each quiz step based on the quiz game set. The setting value of each quiz step includes the best answer, the reflection method of the score result, the answer closing condition, and the answer deadline hour etc.

When the quiz operator inputs the specific command through the input module 150, the quiz operating module 200 requests the quiz channel or transmits the command of progressing the quiz game through the quiz channel based on the specific command. The quiz operating module 120 serves to output the information associated with the quiz game received from the quiz operating server for the quiz operator. The information associated with the quiz game includes the present participation number, the analyzed result of the survey query, the ranking information etc. The quiz operating module 120 transmits the message inputted individually by the quiz operator and the guide message to quiz participants through the quiz channel.

It is preferred that the quiz terminal 100 displays the progress information of the quiz step. The progress information of the quiz step includes any one of the number of the total quiz steps, the number of the present quiz step, the number of the remaining quiz steps, the number of total participants, the present condition of the answer completion, the participants of the major rank, the average score, the closing time of the remaining answer, the scoring method, and the reflecting method of the score result.

If the quiz participant selects or inputs the answer about the question by using the quiz terminal, the quiz terminal transmits the answer input time, the symbol corresponding to the selected answer, and the answer data to the quiz server.

The quiz terminal 100 includes the quiz operating module 120. The quiz operating module 120 requests the preparation of the preparation of the quiz channel to the quiz operating server 200 or transmits the command about the quiz game operation in the quiz channel to the quiz operating server 200 according to the command of the quiz operator. The quiz operating module 120 serves to progress automatically or manually each quiz step according to the command of the quiz operator. The quiz operating module includes an UI for supporting the key word input for the search of the quiz and the category search service. The quiz operating module 120 transmits the identification code for identifying the quiz channel included in the E-mail or the message to the quiz terminal of the quiz participant so as to invite the participant.

The quiz terminal 100 includes an answer input module. The answer input module serves to express the example answer on the objective question, allow the participant to input and select the answer through the touch, the click, the voice, the moving picture or the message input etc., and allow the participant to input the answer through the mouse, the keypad, the keyboard, or the motion etc. on the subjective question. The answer input module indicates the sequence number of the quiz steps or the remaining time limit, plays the audio data established by the quiz operator, or displays the screen through the moving picture, the image, and the text etc.

The chargeable disclosure quiz is a quiz game set or a quiz step of paying the price for the chargeable condition. The quiz operator uses the chargeable disclosure by means of a mode of using the designated chargeable disclosure quiz after the payment of a certain amount or the promise of payment.

The cost according to the use of the chargeable disclosure quiz is any one of a first method of using points purchased or accumulated by the quiz operator in advance for the usage of the chargeable disclosure quiz, a second method of directly purchasing through the electronic commerce, a third method of settling the amount of money on the use of the chargeable disclosure quiz after the use thereof for the specified period, and a fourth method of paying the cost on the right to use the chargeable disclosure quiz of the specified range for the specified period. The giveaway according to the use of the chargeable disclosure quiz can be provided to the quiz producer.

When the disclosure condition is determined in the chargeable disclosure quiz, it can set up the limit of the maximum number available or the limit of the number of simultaneous quiz participant.

The sponsor quiz is a quiz game set or a quiz step using a format including a payment condition of providing to a user subject by means of a sponsor subject in the use of the quiz solving. The use subject may be the quiz operator or the quiz participant. When the quiz operator organizes the quiz game set, the sponsor quiz is included therein, so that the quiz questions can be solved by the quiz participant. In case of the quiz game set, it reuses the quiz game set so as to progress the quiz solving.

In the sponsor quiz, the giveaway paid according to the use thereof is charged in advance. Whenever the sponsor quiz is used, the sponsor giveaway is provided according to the accumulation of the quotation number. If the sponsor giveaway is exhausted, the quiz operator can no longer use it. The sponsor giveaway may be any one of the goods, the cash, the point, the cyber money, the gift certificate, the discount ticket, the free ticket, and the application ticket.

In the sponsor quiz, it can restrict the usage thereof or the supply of the giveaway according to the number of simultaneous quiz participant, and the number of the answerer, and the number of the correct answerer.

The quiz terminal includes the quiz edit module 130 for preparing the quiz game set or the quiz step. The quiz edit module 130 includes the input means for inputting the query of the quiz, the example sentence, the answer limiting condition, and the best answer etc. The quiz edit module 130 receives the data necessary for the construction of at least one quiz step based on the quiz question and the game progress data for progressing the game on the quiz game set so as to constitute the quiz game set data used in the quiz game of one set. The game progress data may be the schedule according to the game progress of the quiz step and the data such as the text, the voice, and the video information etc. sent to the quiz terminal. The game progress data may be additional materials such as the hint, the presented word, the help, the example answer, the correct answer comment, the background music, and the background image etc. The game progress data can further include the team organization condition. The team organization condition may be any one of the number of team, the number limit of the member, and the team organization mode. The team organization mode includes the quiz game history information and the personal information of the quiz participant such as the entrance order of the quiz channel, the number of the participation, the average score ratio, the accumulation rank etc. Moreover, the information condition of dividing the team includes the relation condition between the persons such as the family, the husband and wife, and the friend etc.

The quiz edit module 130 serves to edit a new quiz game set by linking with the quiz search module 270 of the quiz operating server 200, so that the quiz producer quotes the existing quiz game set and quiz step, thereby editing the new quiz game set. The quiz edit module requests the search of the quiz game set and the quiz step stored in the quiz DB 240 according to the quiz producer and receives the data of the quiz step and quiz game set. Also, the quiz edit module edits the data including the quiz step and prepares the new quiz game set. If the quiz producer completes the preparing of the quiz game set, the quiz game set data is transmitted to the quiz operating server 200. The quiz game set data includes the quoting information about the original quiz game set. The quiz operating server 200 of receiving the quiz game set data serves to record it in the quiz DB 240. At this time, the quiz storage module 250 additionally records the quoted information about the original quiz game set with reference to the quoting information about the original quiz game set.

If the quiz operator or the quiz participant inputs the quiz satisfaction or quiz users' comments on the quiz game set or each quiz step to the quiz terminal, the quiz terminal transmits the correspond data in the quiz operating server 200. The quiz storage module 250 of the quiz operating server 200 records the information on the quiz satisfaction or quiz users' comments in the quiz DB 240.

The quiz edit module 130 allows the quiz step included in the quiz game set to be configured to include the information related to at least one quiz question, the best answer, the answer closing condition, the scoring method, and the reflecting method of the score result etc. Also, in the quiz step, it includes the data of the survey, the example answer, the hint, the presenting data, the progressing message, the correct answer explanation, the comment, the description etc. The quiz step and the quiz game set include the data of the text, the image, the sound, and the voice etc. and the quiz edit module 130 serves to support the construction of the quiz step by using such various data.

In the quiz step included in the quiz game set, preferably, it is individually divided into the reflecting method of the score result, the schedule, and the answer closing condition etc. However, they are commonly designate in the quiz game set so as to be commonly applied to the quiz step included in the quiz game set.

FIG. 7 is a schematic diagram illustrating an UI for the quiz edit module 130. In FIG. 7, the text-centered inquiry data, the presenting data, the hint, the example answer, the best answer, and the best answer condition etc. are inputted. Also, it is additional possible to input the voice, the image, and the moving picture. As shown in the screen of FIG. 7, the quiz edit module 130 can set up the detailed data on each quiz step. Although it is not illustrated in the drawing, it is preferred that the quiz edit module 130 separately provides the setting step of the progress data of the quiz game set. The game progress data of the quiz game set can further include the data such as the progress sequence of the quiz step, the delay time per the quiz step, the beginning guidance, the end guidance etc. The quiz edit module 130 transmits the data established as the quiz game set and quiz step to the quiz storage module of the quiz operating server to be recorded and the persons can openly establish it according to the demand of the quiz producer.

Figure 8:
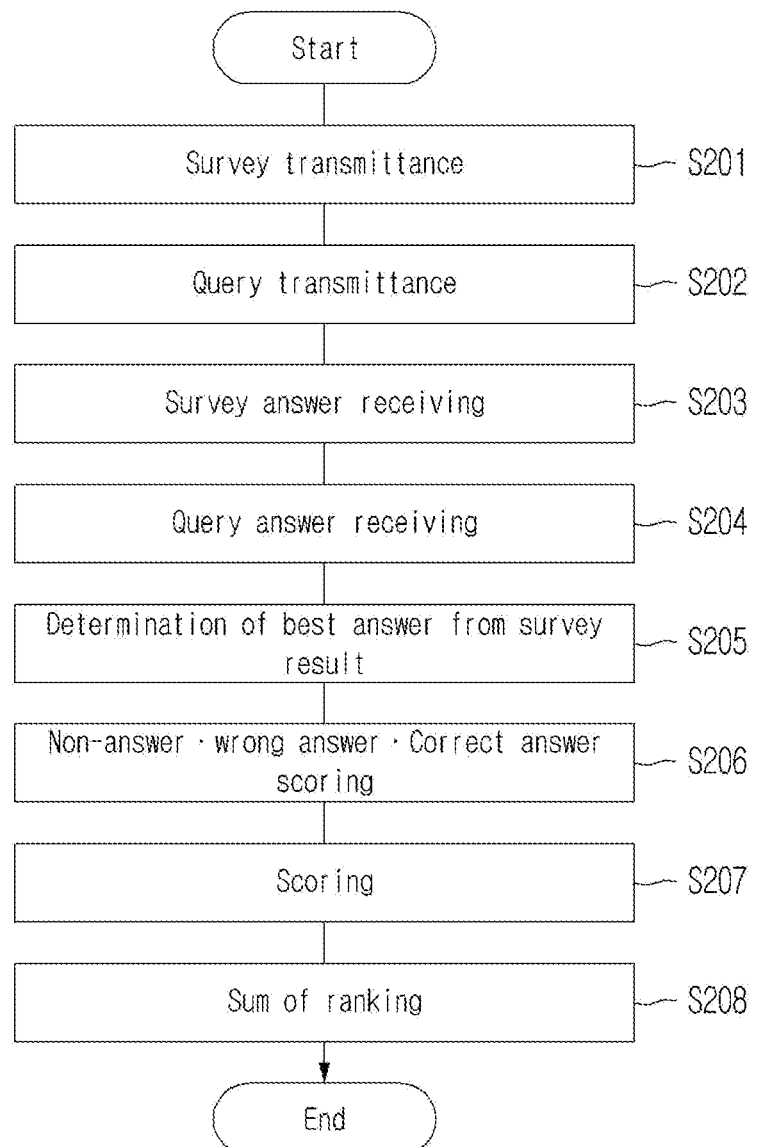
FIG. 8 is a flow chart illustrating an automatic progress of a quiz game about a bidirectional quiz step.

FIG. 8 is a flow chart illustrating an automatic solution about the bidirectional quiz step in that the best answer is designated as a condition form.

The best answer of the condition form includes a survey quiz step, the conformity type quiz step, the relational quiz step etc. It automatically gives marks from the answers of the quiz operator or the quiz participant. For example, in the quiz step including the survey "the most you want something to eat in a get-together today?" and the question "the food in second in a get-together today?", the answer is not sealed. That is, since the answer is determined through the analysis of the survey result, it can automatically give marks through the clear statement of the best answer condition.

There is the conformity type quiz step as another quiz step for automatic scoring of the best answer condition. The conformity type quiz step is a mode of recognizing as a correct answer only when the answer is in accord with the answer of the specific person. For example, there are a first mode of adopting as the answerer only when the quiz participant inputs the same answer as that selected or inputted by the quiz operator and a second mode of recognizing as a correct answer only when the answer of the team member is in accord with the answer of the team leader in case of including the plural teams. For example, in the quiz solving in which the husband and wife constitute one team, where it asks the first place of date, it recognize as a correct answer only when the answers of the husband and wife are in accord with each other.

There is a relational quiz step as further another quiz step for automatic scoring of the best answer condition. The relational quiz step is mode of determining the best answer by means of the relation with the answer of the specific quiz participant. The paper-rock-scissors game can be given as an example. That is, the specific quiz participants select one of Rock, Paper, and Scissors in each quiz step and it compares with the answer presented by the specific quiz participant or the quiz operator, so that it determines the best answer on the winner or the loser etc.

The answer closing condition designates as to when it finishes the answer. In the quiz solving service presented as the embodiment of the present invention, where many persons are participated at the same time, it is configured to add the answer closing condition so as to prevent the progress speed of the quiz operation from being slowed owing to the poor answer of the participant. The answer closing condition includes the condition of passing the answer deadline, the condition of presenting the answer by means of the whole answerers, and the condition of providing the answer over the number of the designated answers or the fixed rate thereof. Also, it can mix various conditions.

In the scoring method, it can choose any one of a mode of adding the designated score by sorting correct answer/incorrect answer/non-answering etc. in the specific quiz step and a mode of adding and subtracting the score by discriminating the correct answerer and the incorrect answer etc. Also, it can provide the score according to the answer input time, and the order of answer arrival or the answer arrival time.

When one question and the example answer are used in the plural quiz steps, it can share the quiz question or the example answer in the quiz step.

The quiz edit module 130 serves to organize the quiz synchronized and solved by participants stage by stage and establish the time necessary for the progressing per these steps. Also, the message, which is delivered to the participants is set up at regular time so as to constitute one quiz game set.

Referring to FIG. 8, the process of the bidirectional quiz is automatically executed. In the survey type bidirectional quiz step included in the quiz game set necessary for progressing the quiz game, the quiz channel module 260 of the quiz operating server serves to transmit the survey (S201) and the query (S202). Here, the order of the survey and the query may be reversed or the survey and the query may be transmitted together. Then, the survey answer (s203) and the query answer (S204) are received from the quiz terminal. At this time, the order of the survey answer and the query answer may be reversed. The quiz channel module 260 determines the best answer from the result of the survey answer using the best answer condition (S205) and progresses the scoring (S206) on this and the reflection (S207) of the score result and then, sums up the ranking (S208). In this process, the quiz help or the hint of the quiz step etc. can be provided during the receiving of the answer. However, when the answer receipt is finished, the quiz channel module 260 stops the hint remained in the corresponding quiz step.

Figure 9:
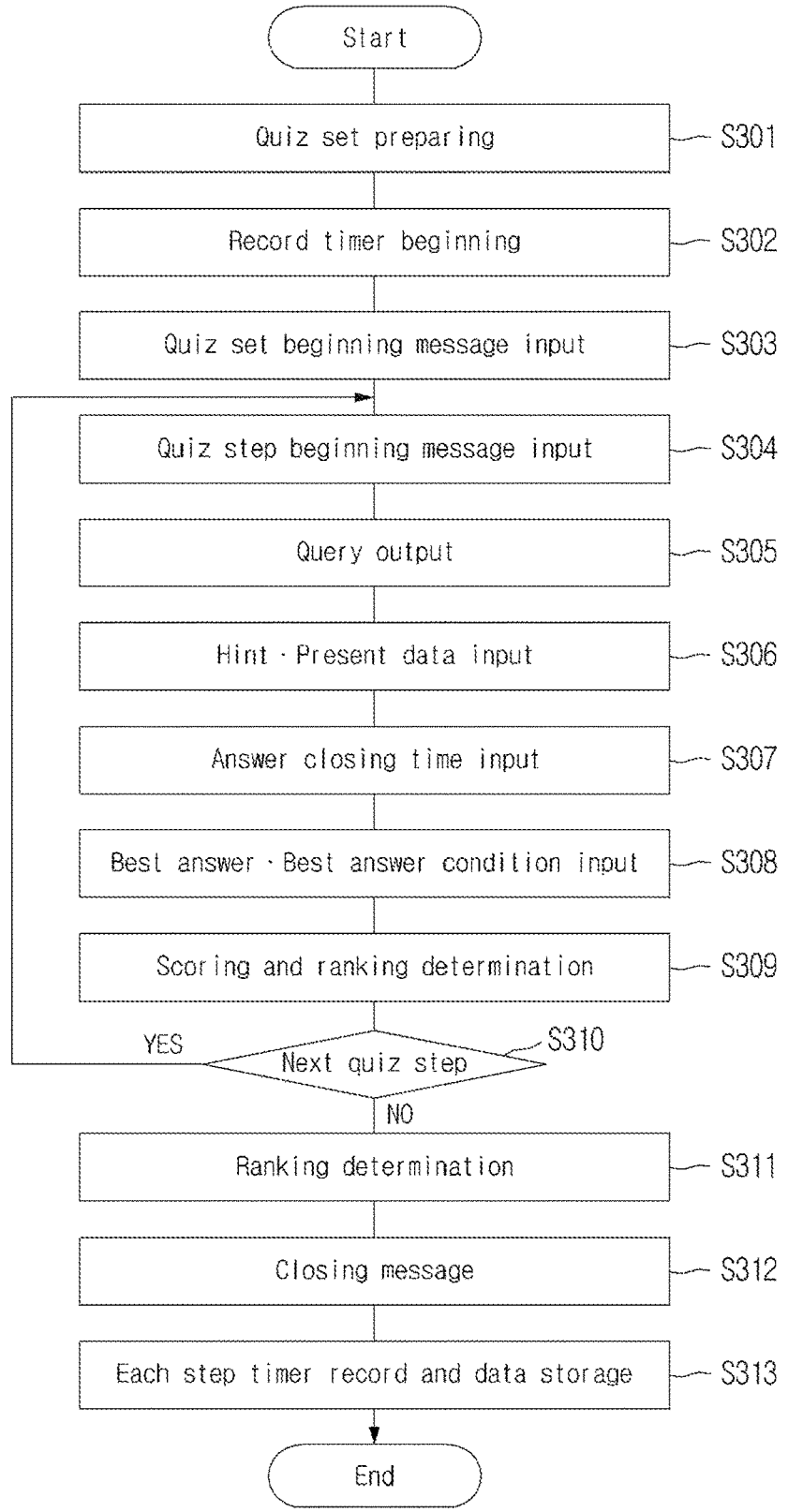
FIG. 9 is a flowchart illustrating a contents producing method of a quiz game set using a recording method for automatic execution of a quiz game set.

FIG. 9 is a flowchart illustrating a constitution method of the quiz game set using the recording function of the quiz terminal.

In the constitution mode of the quiz game set using the recording function of the quiz terminal according to FIG. 9, in a state that only the quiz question of each quiz step is inputted, the method for adding the additional data on the quiz progress is presented. It can be altogether commonly applied to the embodiments 1 and 2. It prepares the quiz game set including the plural quiz steps, manually progresses the quiz solving after the execution of the timer, measures the time of each progress step, and records the automatic execution unit of the quiz game set to complete the quiz solving schedule of the quiz game set.

The quiz game set constituted through the record is established as the final quiz game set by means of the adjustment of the quiz game set edit module. The quiz edit module 130 prepares the quiz game set for additional editing (S301). It starts the timer according to the recording (S302). The quiz edit module 130 receives the beginning message of the quiz game set from the quiz producer (S303). Subsequently, it receives the beginning message of each quiz step included in the quiz game set (S304). The query of the quiz step is outputted (S305) and the hint and presenting data (S306) are input. Until the answer closing time is ended, the hint and the presented word are continuously received in each step (S306). Here, each time information is accumulated and each time information is changed into the relative time information. If the answer closing time is not designated, the separate answer closing time is inputted to be designated. After the answer closing time is designated, it receives the best answer or the best answer condition (S308). Also, it receives the items on the reflection of the score result and the decision of rank, so that the schedule and the input of the progress information of the quiz step are terminated and it continues the next quiz step. If all the quiz steps are terminated, it receives the decision mode of rank (S311) and the closing message (S312). Then, it altogether stores the timer and the received records (S313) to be ended. The quiz edit module 130 serves to transmit the quiz game set constituted by the above method to the quiz operating server or the quiz storage server. The quiz operating server or the quiz storage server stores the quiz game set in the quiz DB. Here, each quiz step includes the quiz queries prepared in advance so as to complete the quiz game set having each quiz step or the quiz queries of each quiz step can be directly inputted in the recording process.

In the embodiments of the present invention, as though the function of the quiz operating server is different from that of the quiz terminal for the convenience of the explanation thereof, the major function of the quiz operating sever is integrated with the quiz terminal, so that the personal terminal can be utilized as the quiz operating server and the quiz terminal at the same time.

Embodiment 2

The embodiment 2 relates to a method and a system of providing the bidirectional quiz solving service in that the software corresponding to the opening of the quiz channel and the quiz channel module, which is the major function of the quiz operating server, is installed in the terminal of the smart phone, the tablet PC, the laptop personal computer, the PC etc., so that it is utilized as the quiz terminal, thereby the quiz terminals of other quiz participants can be communicated with the quiz operating terminal through the network means.

Figure 10:
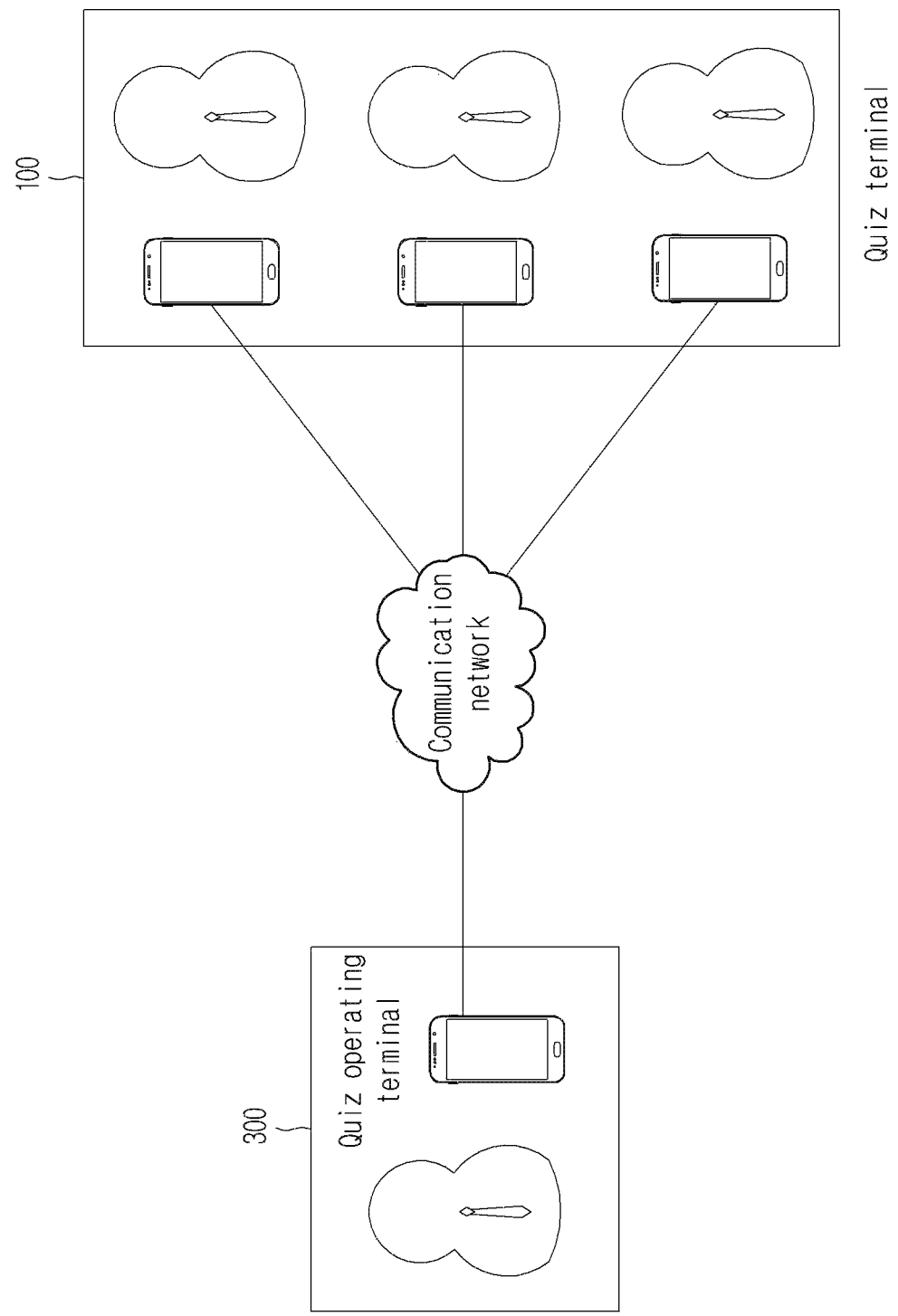
FIG. 10 is a schematic diagram illustrating a construction of a communication system of a second embodiment of the present invention.

FIG. 10 is a schematic diagram illustrating the embodiment 2. As shown, the quiz channel module 260 of the quiz operating server is added to the quiz application terminal 300 and the quiz application terminal 300 serves to provide the quiz game to the quiz terminal 100 through the network.

In the embodiment 2, it is preferred that the separate quiz storage server for performing a major function of storing and searching the quiz is provided. At this time, the quiz storage server is connected to the quiz operating terminal through the network means. The quiz storage server serves to perform the quiz search and the transmit function about quiz game set and quiz step according to the request of the quiz operating terminal. The quiz operating terminal serves to receive the quiz game set or the quiz step from the quiz storage server (not shown) and provide the quiz game to the quiz terminals.

The embodiment 2 is different from the embodiment 1 in terms of the format of incorporating the quiz channel module for providing the quiz game of the quiz operating server to the smart terminal including the smart phone, the cellular phone, the tablet PC etc. Since the configuration principle and driving mode thereof are similar with each other, the separate description is omitted here.

Although the invention has been described according to the preferred embodiment mentioned above, the invention can be variously changed and modified without deviating from the essential point and scope of the invention. Accordingly, the accompanying Claims include such change and modification belonging to the essential point of the invention.

The invention claimed is:

1. A quiz game providing method using a user creating quiz game set by a quiz operating server comprising steps of:
receiving a quiz game set having at least one quiz step and a game progress data from a quiz terminal of the quiz producer;
storing the received quiz game set in a quiz DB;
preparing a quiz channel according to the request of a terminal of the quiz operator;
transmitting a query contents of the quiz step included in the quiz game set to the quiz terminal;
receiving a quiz answers from the quiz terminal until an answer closing condition of the quiz step is established;
scoring the quiz answer by means of a scoring method of the quiz step;
wherein the scoring method comprises a step of determining a best answer by analyzing the answer received from the quiz terminal according to a best answer condition included in the game progress data of the quiz game set;
reflecting a score result on the quiz participant according to a mode designated in the quiz step; and
ending the quiz game when the quiz step included in the quiz game set is ended,
wherein, the quiz game set is separately provided to the quiz participant connected to the quiz channel.

2. A quiz game providing method using a user creating quiz game set as claimed in claim 1, wherein the quiz answer receiving step further comprises a step of transmitting at least one of hint data and presenting data included in the quiz game set to the quiz terminal by means of the quiz operating server.

3. A quiz game providing method using a user creating quiz game set as claimed in claim 1, wherein the quiz game set or a specific quiz step included the quiz game set is any one of a pay quiz of providing a giveaway to a quiz owner according to the use of the quiz, a sponsor quiz of receiving a giveaway from the quiz owner according to the use of the quiz, and a free quiz in that the giveaway is not provided to the quiz owner and the giveaway is not received from the quiz owner according to the use of the quiz; and it stores an usage record on the quiz game set or a specific quiz step after the quiz solving on the specific quiz step and the quiz game set is finished.

4. A quiz game providing method using a user creating quiz game set as claimed in claim 1, wherein the quiz operating server progresses the quiz solving of the quiz step including a survey query; the query contents transmitting step of the quiz step further comprises a step of transmitting the survey query included in the quiz step to the quiz terminal; and the quiz answer receiving step further comprises a step of receiving a survey answer of the quiz participant on the survey query.

5. A quiz game providing method using a user creating quiz game set as claimed in claim 1, further comprising step of dividing the quiz participants into a plural teams, wherein it scores the answer on the participants of constituting the team in the scoring step and it determines pass or failure or accumulates the scores in the score result reflecting step.

* * * * *